(No Model.)
H. FRICKER.
PORTABLE COOKING APPARATUS.
No. 401,261. Patented Apr. 9, 1889.
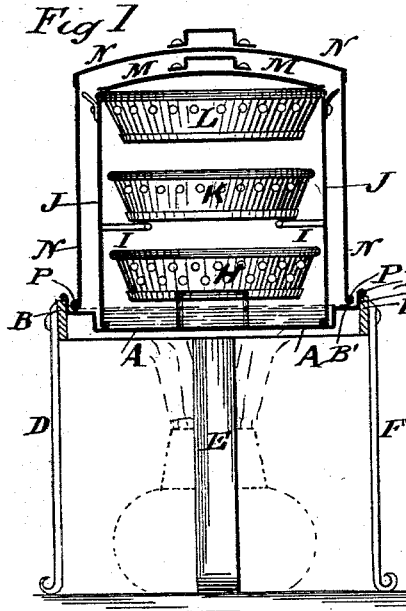
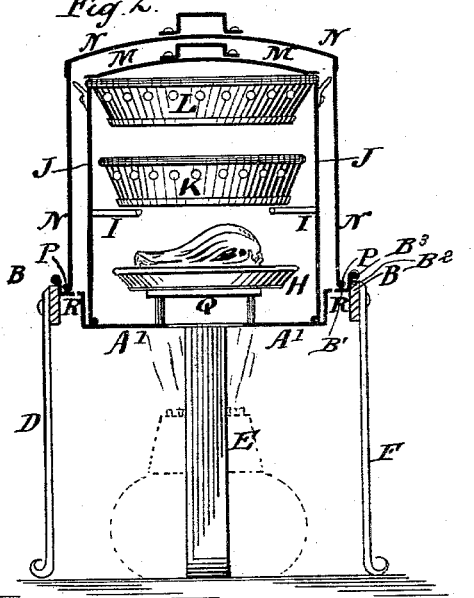
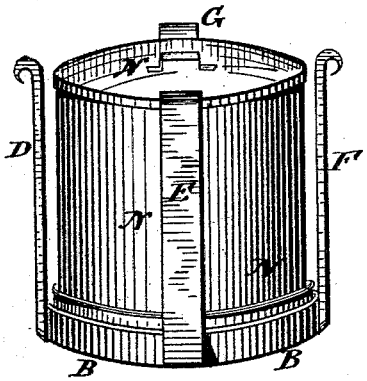
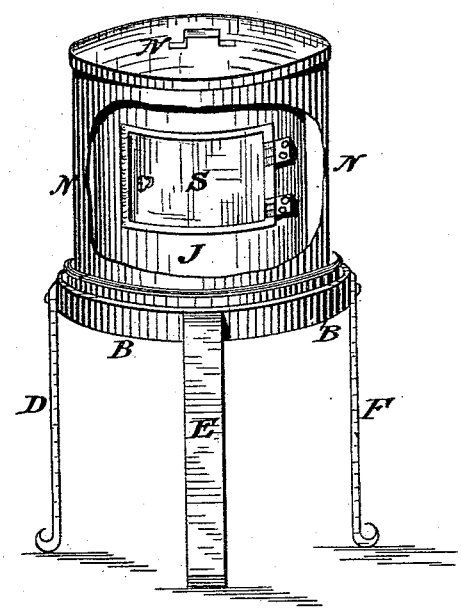
Witnesses.
J. A. Rutherford.
Robert Surrett.
Inventor,
Henry Fricker
By James L. Norris.
Atty.

UNITED STATES PATENT OFFICE.

HENRY FRICKER, OF LONDON, ENGLAND.

PORTABLE COOKING APPARATUS.

SPECIFICATION forming part of Letters Patent No. 401,261, dated April 9, 1889.

Application filed December 27, 1887. Serial No. 259,076. (No model.) Patented in England November 16, 1887, No. 15,734; in France December 20, 1887, No. 187,724; in Belgium December 21, 1887, No. 80,012, and in Cape of Good Hope April 4, 1888.

*To all whom it may concern:*

Be it known that I, HENRY FRICKER, a subject of the Queen of Great Britain, residing at London, England, have invented certain new and useful Improvements in Portable Cooking Apparatus, (for which I have obtained Letters Patent in Great Britain, No. 15,734, dated November 16, 1887; France, No. 187,724, dated December 20, 1887; Belgium, No. 80,012, dated December 21, 1887, and Cape of Good Hope, dated April 4, 1888,) of which the following is a full, clear, and exact description.

The object of my invention is to construct, arrange, and apply a series of cooking utensils capable of being fitted within a vessel to enable various kinds of food to be cooked by steam heat derived from a small quantity of water contained in a lower vessel, the heat to which is imparted by an ordinary oil-lamp or gas flame which impinges upon the water-container. Some of the food-containing vessels have perforated sides for the passage of steam and others are entirely closed for cooking by steam heat acting upon the outside of said vessels, the whole of said vessels being inclosed by an outside canopy or covering. Instead of the water-vessel—such as when baking or roasting has to be carried on—the flame of the lamp or gas may impinge against the bottom of a screen or heat-diffuser inserted into the casing, and by means of trivets or folding frames a joint can be roasted by the surrounding heat and hot air, which are retained within and around the vessels by means of the canopy and outer covering. Other vessels being placed above the joint, perforated or not, for the free passage of heated air between and among them, pies can be baked, and other processes of cooking can be effected. The whole of the vessels or appliances are made to fit within one another in a very compact manner, and when inclosed by the outer covering and secured in position form, so to speak, a kitchen in itself for ready transport, specially applicable for picnic parties, boating parties, traveling, for emigrants, and others.

Figure 1 of the annexed drawings is a sectional elevation of the cooking apparatus when steam heat is employed for cooking food by moisture. Fig. 2 is a sectional elevation of the same apparatus, but with another bottom plate through which a hole is formed, said hole being covered by a screen or heat-diffuser when the apparatus has to be used for dry-heat cooking—such as for roasting or baking—whether it be meat or poultry, vegetables, such as potatoes, or pies or pastry. The apparatus when used for cooking purposes has the appearance shown at Fig. 3, a portion of the outer vessel being removed to show the door of the inner casing, the opening of which enables, when cooking by dry heat, any of the internal dishes or trays to be removed. Fig. 4 shows the apparatus with the stand reversed and the apparatus inclosed within the legs of the stand for ready transport.

According to Fig. 1, A is an open shallow tray or dish with a sunken central portion forming a water-well. The tray is provided with a lateral surrounding flange, B', from which rises a vertical annular flange, $B^2$, having an annular bead, $B^3$, to rest upon the upper edge of the ring B. To the ring B are secured by pivots the legs D, E, F, and G, so that the legs can be swung up, as shown in Fig. 4.

H is a metal dish provided at its bottom with legs to support the dish H above the level of the water, the sides of the dish being perforated.

I I are supports within a barrel or inner cylinder, J, on which supports I I a second dish, K, can be fitted. The bottom of the inner barrel or cylinder, J, rests upon the annular flange B' of the shallow water-tray A in the well and immersed in the water, making a water seal which closes it against the atmosphere.

L is another dish resting on the top of the inner barrel or cylinder, J, and is covered by a lid, M, so that the chamber or space within the inner cylinder is hermetically closed, or nearly so.

N is a cylindrical case or canopy which incloses the inner barrel or cylinder, J, and consequently the dishes within it. This canopy or covering is dropped over the inner cylinder, its bottom edge resting on the step-piece of the shallow water-vessel, but at a slight distance from the edge of said vessel, so that the water is kept just above the beading or rim P, to insure that no steam can escape or air be admitted.

An ordinary oil-lamp or a gas-jet placed under the shallow water-vessel A will heat the water and produce steam sufficient to cook all the food that may be within the dishes, which may vary in number according to the size of the apparatus and the requisite quantity of food to be cooked.

If the two dishes K L only be inserted into the apparatus, the lid M fits the top of the barrel or inner cylinder, J, to inclose the two dishes only.

To utilize the apparatus for baking or roasting, I dispense with the water-vessel A and substitute therefor a similarly-made tray or bottom, A', for the inner barrel or cylinder, J, and also the outer covering or canopy, N, to rest upon. This bottom tray has an aperture through its center and above the aperture a screen, Q, with a clear space round it, so that the heat derived from a lamp or from a gas flame can enter the inner cylinder and be diffused by the screen or heat-diffuser Q for cooking food by dry heat, said heat being confined within the inner barrel or cylinder, J, for that purpose. The step-piece of this shallow vessel may be perforated at R for the escape of the superfluous heated air from between the inner vessel, J, and canopy N.

I have shown the two dishes K L perforated near their upper edges, but the sides may be plain when the pie-crust is formed on the top edge; but for rice, sago, and semolina, the holes round the sides allow the heat to attack and brown the top, this being assisted by reflected heat from the bottom of the upper dish.

The inner dishes can be removed at any time by the door S of the inner cylinder, J, (see Fig. 3,) being opened.

Cooking, whether by steam heat or by dry heat, by my apparatus requires no attention during the cooking operation.

The bottom A' is made to fit within the bottom A, and when the dishes H K L are inserted within one another and within the inner cylinder or barrel, J, in compact order and the stand reversed, as at Fig. 4, and the apparatus placed within the legs, as there shown, a simple cord tied across the top enables the whole of the apparatus to be carried by hand.

I claim—

A portable cooking apparatus consisting of the ring mounted on supporting-legs, the dished tray having a lateral flange, and a projecting bead above the flange removably supported on the ring, the dish-containing cylinder detachably resting on the bottom wall of the tray and provided with an opening and closing door in its vertical side wall and having inwardly-projecting dish-supports and a removable closely-fitting cover, and the imperforate closed cylindrical casing detachably resting on the lateral flange of the tray, above the bottom wall of the latter, and inclosing and entirely covering the dish-containing cylinder, substantially as described.

In witnesses whereof I have hereto signed my name, in the presence of two subscribing witnesses, this 8th day of December, 1887.

HENRY FRICKER.

Witnesses:
  H. GARDNER,
    *Patent Agent.*
  RICHARD CORE GARDNER,
*Both of 166 Fleet Street, London, England.*